No. 720,517. PATENTED FEB. 10, 1903.
R. L. FRINK & W. DE H. LEE.
APPARATUS FOR MAKING SHEET GLASS.
APPLICATION FILED NOV. 23, 1901.
NO MODEL. 2 SHEETS—SHEET 2.
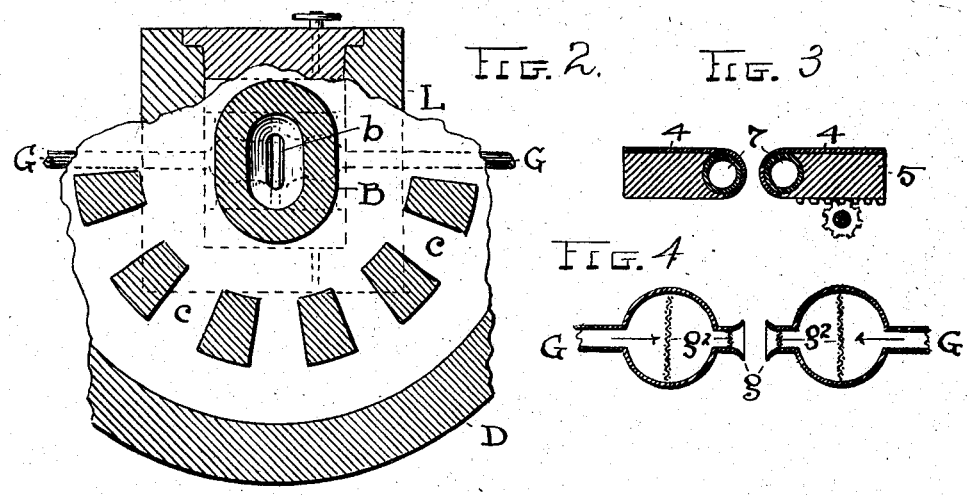

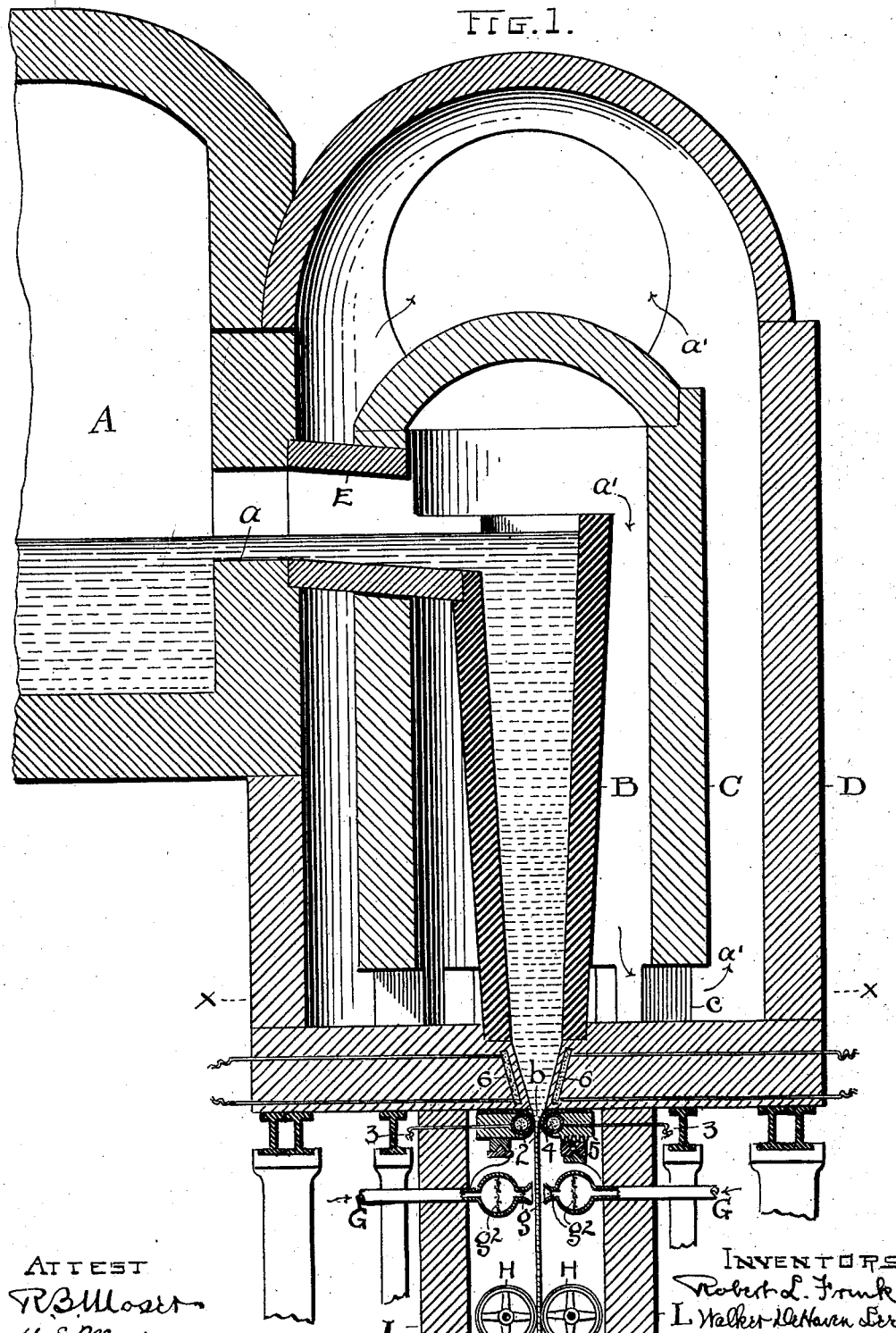

UNITED STATES PATENT OFFICE.

ROBERT L. FRINK AND WALKER DE HAVEN LEE, OF CLEVELAND, OHIO, ASSIGNORS TO THEMSELVES, H. R. SANBORN, J. N. CLARKE, AND THOMSON McGOWAN.

APPARATUS FOR MAKING SHEET-GLASS.

SPECIFICATION forming part of Letters Patent No. 720,517, dated February 10, 1903.

Application filed November 23, 1901. Serial No. 83,479. (No model.)

*To all whom it may concern:*

Be it known that we, ROBERT L. FRINK and WALKER DE HAVEN LEE, citizens of the United States, residing at Cleveland, in the county of Cuyahoga and State of Ohio, have invented certain new and useful Improvements in Apparatus for Making Sheet-Glass; and we do declare that the following is a full, clear, and exact description of the invention, which will enable others skilled in the art to which it appertains to make and use the same.

Our invention relates to an apparatus for making sheet-glass; and the invention consists in the construction and combination of parts substantially as shown and described, and particularly pointed out in the claims.

In the accompanying drawings, Figure 1 is a vertical sectional elevation of one end of the primary mixing and melting tank and of the entire secondary or tempering and feed tank and of certain parts connected therewith for taking care of the glass as it leaves the last tank. Fig. 2 is a plan view on line $x\ x$, Fig. 1, showing a portion of the mechanism beneath and the shape of the parts on which said line is taken. Fig. 3 is a cross-section of a modification of the mechanism at the throat of the secondary tank which controls the flow of glass therefrom, and Fig. 4 is a cross-section of the air-blast devices lower down as seen in Fig. 1.

In the production of sheet-glass according to our invention the raw material is delivered into a melting and mixing tank, retort, or furnace A, which is the primary or receiving tank or retort. This tank or retort is designed to be of a large size comparatively, so that a ton, more or less, of raw material may be emptied into it without materially affecting the temperature of the molten mass or its general level at the overflow or bridge wall $a$. The said tank A may also be of any suitable construction, size, or style, and the molten glass in the present construction overflows into the feed-tank B. The tank B is preferably circular in cross-section at its top and downward some distance, but runs into an elliptical shape farther down and thence into a long narrow slot or discharge $b$ at its bottom, to which it tapers in such lines that the pressure or weight of the glass rests over said mouth and insures an even flow of material therefrom the full width thereof. A wall C incloses tank B, and said tank may be heated by the products of combustion from tank A, which flow downward about tank B, as indicated by arrows $a'$, or it may be heated from an independent source, and a heavy outside wall D incloses wall C and tank B, as shown. A tile or other like tube or pipe E, which will not melt, delivers the liquid material from tank A to tank B through wall C, and the line of draft for the heat is about tank B and down through the bottom of wall C by openings or flues $c$ and thence up between walls C and D and out. Tank B requires more or less external heating beyond the temperature that comes over with the molten glass from tank A, and the degree of such heat will always depend on conditions which may vary in the same plant and at different times according to many things entering in to make or require a change. For example, the state or temperature of the liquid glass coming over, the quality or character thereof giving it more or less tendency to harden, the speed at which it is drawn off, and other conditions always affect this place and largely determine what measure or degree of heat should circulate about tank B. However, the further idea of this arrangement of tank B and its surrounding parts is to bring the glass to a condition for handling mechanically immediately upon its leaving said tank. To this end the discharge or slot $b$ has its sides 2 formed or lined with some smooth refractory material, such as carbon, having electrical connections 3 and a refractory metallic covering 4, between the sides of which parts the semiliquid or more or less cooled and thickened glass flows by gravity and takes on the desired form. The carbon 2 and plate-covering 4 are carried on one side at least by a laterally-adjustable block or piece 5, which is controlled by a rack and pinion, so as to narrow or enlarge the said slot or outlet according to the thickness of sheet wanted or to stop the flow. Above this the sides of the tank are substantially V shape, and behind or in these converging walls are located electrically-connected conductors 6 of high resistance, such as suitable carbon plates, so that here, too, as well as in the electrical devices 2, such uniform degree of heat may be maintained as the state of the flowing material may require. Having passed the slot $b$ out of tank B the glass has taken on, say, a sheet or plate form; but it is still soft and flexible. Then to harden it as much more as it may need before passing to the next step in its treatment we have arranged to deliver a regulated air-blast against the same from opposite sides through blast pipes or tubes C, provided with suitable nozzles $g$, and in these pipes we preferably provide spaces with screens $g^2$, adapted to intercept any particles of dirt or dust which might injure the glass if driven into or upon the surface thereof. The said air-blast should also be uniformly distributed over the surface of the glass from edge to edge by one or more blasts or jets, so as to affect all portions equally.

What we claim is—

1. An apparatus for making sheet-glass comprising a melting-furnace for the raw material and a delivery-tank for the molten glass having a covered overflow-passage thereto, and a plurality of inclosing walls about said delivery-tank, said walls and tank having heat-circulating spaces between them, whereby the temperature of the said tank may be regulated, substantially as described.

2. The melting-furnace for the raw material, and the delivery-tank for the molten material open to said furnace, an inclosing wall about said tank having an inclosed draft-inlet at its top from said furnace, and an outlet at its bottom at the bottom of said tank, and an outer wall about said inclosing wall with an outlet at its top, substantially as described.

3. The glass-melting furnace, the delivery-tank in overflow relation thereto through the furnace-wall, an inclosing wall about said tank open at its top to said furnace and having draft-outlets about its bottom, the wall separating the tank from said furnace having a single opening for the inlet of molten glass to the tank and heat to said inclosing wall and the top of the tank open to the space within said wall, substantially as described.

4. The melting-furnace for the glass and the receiving-tank open thereto, in combination with means to control the heat in the walls of said tank comprising a heat-inclosing wall about the tank and apart therefrom to permit a circulation of hot air about the tank and electrically-controlled heating devices at the mouth of the tank, substantially as described.

5. In glass-making apparatus, a delivery-tank for the molten glass and a melting-furnace having a covered overflow-discharge into said tank and a wall about said tank having a draft-outlet at the bottom of said tank, the space between said tank and wall constituting part of the draft-channel from the melting-furnace, substantially as described.

Witness our hands to the foregoing specification this 16th day of November, 1901.

ROBERT L. FRINK.
WALKER DE HAVEN LEE.

Witnesses:
R. B. MOSER,
H. E. MUDRA.